United States Patent
Yoon et al.

(10) Patent No.: US 9,417,472 B2
(45) Date of Patent: Aug. 16, 2016

(54) METHOD FOR MANUFACTURING COLORLESS TRANSPARENT GLASS-FABRIC REINFORCED POLYIMIDE FILM FOR FLEXIBLE DISPLAYS

(71) Applicant: KOREA ADVANCED INSTITUTE OF SCIENCE AND TECHNOLOGY, Daejeon (KR)

(72) Inventors: Choon Sup Yoon, Daejeon (KR); Seung Hyun Oh, Jellabuk-do (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 357 days.

(21) Appl. No.: 14/191,985

(22) Filed: Feb. 27, 2014

(65) Prior Publication Data
US 2014/0238594 A1    Aug. 28, 2014

(30) Foreign Application Priority Data
Feb. 28, 2013    (KR) .................. 10-2013-0022055

(51) Int. Cl.
*G02B 1/10*    (2015.01)
*G02F 1/1333*    (2006.01)

(52) U.S. Cl.
CPC .................. *G02F 1/133305* (2013.01)

(58) Field of Classification Search
CPC ................................. G02F 1/133305
USPC .................. 264/299, 319, 331.12, 271.1
See application file for complete search history.

(56) References Cited

U.S. PATENT DOCUMENTS

| 3,764,449 A * | 10/1973 | Chase | C08G 73/1003 428/435 |
| 2011/0245378 A1 * | 10/2011 | Russ | C08K 3/04 523/400 |

FOREIGN PATENT DOCUMENTS

| KR | 10-1999-0031560 A | 5/1999 |
| KR | 10-2001-0087502 A | 9/2001 |
| KR | 10-2011-0000195 A | 1/2011 |
| WO | WO 2011/033751 A1 | 3/2011 |

OTHER PUBLICATIONS

Shoichi Kubo et al., "Tunability of the Refractive Index of Gold Nanoparticle Dispersions", Nano Letters, Aug. 2, 2007, pp. 3418-3423, vol. 7, No. 11.
Suman Mahendia et al., "Tuning of refractive index of poly(vinyl alcohol): Effect of embedding Cu and Ag nanoparticles", Journal of Applied Physics, 2013, pp. 073103-1-073103-7, vol. 113.
S K Medda et al., "Metal nanoparticle-doped coloured films on glass and polycarbonate substrates", PRAMANA—Journal of physics, Nov. 2005, pp. 931-936, vol. 65, No. 5.

* cited by examiner

*Primary Examiner* — Timothy Kennedy
(74) *Attorney, Agent, or Firm* — Rabin & Berdo, P.C.

(57) ABSTRACT

A method of manufacturing a colorless transparent polyimide film having reinforced glass fabric for flexible displays, suitable for use in increasing optical transmittance of a polyimide substrate having reinforced glass fabric for flexible displays. This method enables the glass fabric and the colorless transparent polyimide film to be matched in refractive index when the glass fabric is reinforced in the colorless transparent polyimide film to enhance thermal and mechanical properties of a substrate for flexible displays, thus satisfying high optical transparency and optical transmittance of 85% or more, required of a substrate for flexible displays, and thereby the colorless transparent polyimide film having reinforced glass fabric can be used as a substrate for flexible displays.

52 Claims, 2 Drawing Sheets

# METHOD FOR MANUFACTURING COLORLESS TRANSPARENT GLASS-FABRIC REINFORCED POLYIMIDE FILM FOR FLEXIBLE DISPLAYS

BACKGROUND OF THE INVENTION

1. Field of the Invention

The present invention relates to a method for manufacturing a colorless transparent polyimide film for flexible displays, and more particularly, to a method for increasing the optical transmittance of a polyimide substrate with glass fabric reinforced for flexible displays.

2. Description of the Related Art

Various flat panel displays using such techniques as e-paper displays (EPD), plasma displays (PDP), liquid crystal displays (LCD), and organic light emitting displays (OLED) are being utilized in TV sets, mobile phones, monitors, e-books, and mobile devices, among others.

In next generation, however, flexible displays which are portable and convenient to use regardless of time and place, are expected to be widely employed in electronic devices, such as mobile phones, portable terminals, and laptop computers.

A substrate for flexible displays has to possess mechanical flexibility for flexible displays to be easily bendable, rollable, or foldable. While a flat panel display uses a glass substrate, flexible displays should have a mechanically flexible substrate. A very thin glass plate, a thin stainless steel plate, or a plastic film may be used as a flexible substrate, but a very thin glass plate and a stainless steel plate have limitations in terms of flexibility. Thus, the use of a plastic film is the most favorable.

A plastic film substrate has significantly higher mechanical flexibility but has inferior tensile strength compared with glass substrates. When glass fabric is reinforced in a plastic film, the tensile strength of the plastic film may be enhanced as fiber-reinforced plastic.

With the goal of manufacturing a display device, a thin film transistor (TFT) should be provided on a substrate to control the switching and luminance of individual pixels. Currently available TFTs use amorphous silicon, oxide, and organic materials, among others. In the case of amorphous silicon, which exhibits very stable performance, the minimum processing temperature necessary for deposition and thermal treatment is approximately 230° C. When a plastic substrate is subjected to a TFT thin film process at 230° C. and then cooled to room temperature, the TFT thin film may be stripped from the plastic substrate because of a difference in the coefficient of thermal expansion (CTE) between the plastic substrate and the TFT thin film material. To prevent this occurrence, the CTE of the substrate should be approximately 10 ppm/° C.

The CTE of plastic is typically at least 50 ppm/° C. When glass fabric with a CTE of approximately 5 ppm/° C. is reinforced in plastic film, the CTE of the substrate may be reduced to about 10 ppm/° C.

For this reason, glass fabric is reinforced in plastic film to enhance the thermal and mechanical properties of a substrate for a flexible display. In this case, however, if the refractive index of the glass fabric differs from that of the plastic film, light may be scattered by the glass fabric, such that the substrate becomes optically opaque. This condition prevents the use of the above substrate for a flexible display.

Opacity increases in proportion to an increase in the difference in refractive index between the glass fabric and the plastic film. The substrate for a flexible display has to have an optical transmittance of approximately 85% or more. Thus, the refractive indexes of the glass fabric and the plastic film should be maximally matched to ensure the high optical transmittance and transparency of the substrate.

The refractive index of a typical plastic resulting from polymerization of monomers is determined by the monomer. Unless the refractive index of a plastic made of a given monomer coincides with that of the glass fabric, matching the refractive index of a given plastic to that of glass fabric becomes very difficult.

To solve such problems, techniques for adjusting the refractive index of a plastic by dispersing metal nanoparticles in the plastic have been proposed (S. Kubo, A. Diaz, Y. Tang, T. S. Mayer, I. C. Khoo, T. E. Mallouk, Nano Letters, vol. 7, 3418-3423, 2007; S. Mahendia, A. K. Tomar, P. K. Goyal, S. Kumar, J. Appl. Phys. vol. 113, 073103, 2013; S. K. Medda, M. Mitra, S. De, S. Pal, G. De, PRAMANA-Journal of Physics, vol. 65, 931-936, 2005; Korean Patent Application Publication No. 10-2011-0000195 "Plastic substrate and Device including the same", etc.). However, the problem of remarkably reduced optical transmittance attributed to light absorption by metal nanoparticles occurs. In this case, the use of such plastic as a substrate for flexible displays becomes difficult.

SUMMARY OF THE INVENTION

The present invention has been made considering the problems encountered in the related art. An objective of the present invention is to provide a method for manufacturing an optically transparent polyimide substrate with glass (fiber) fabric reinforced for flexible displays.

To accomplish this objective, the present invention provides a method for manufacturing a colorless transparent polyimide film with reinforced glass fabric.

According to the present invention, when glass fabric is reinforced in a colorless transparent polyimide film to enhance the thermal and mechanical properties of a substrate for flexible displays, the glass fabric and the colorless transparent polyimide film are matched in terms of refractive index, thus satisfying the requirements for high optical transparency and optical transmittance of 85% or more. These requirements should be met by a substrate for flexible displays. Therefore, the colorless transparent polyimide film with reinforced glass fabric according to the present invention can be effectively utilized as a substrate for flexible displays.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF SPECIFIC EMBODIMENTS

Figure 1:
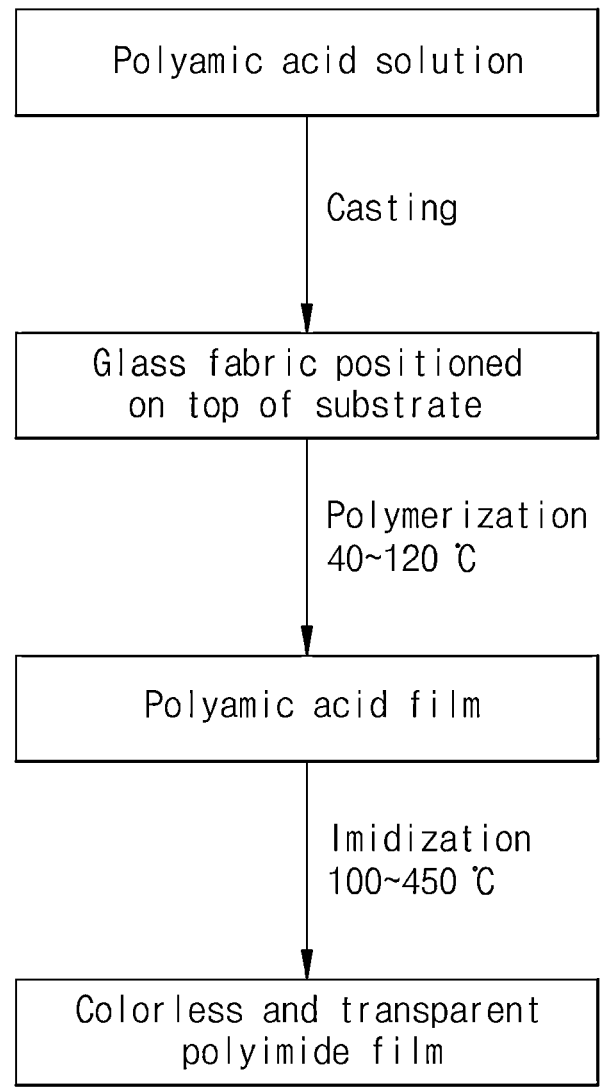
FIG. 1 is a flowchart illustrating the process for manufacturing a colorless transparent polyimide film with reinforced glass fabric according to the present invention.
Figure 2:
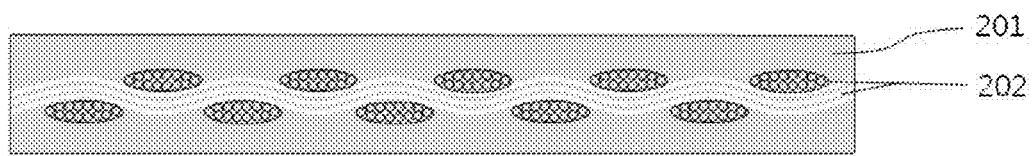
FIG. 2 illustrates a colorless transparent polyimide film substrate according to the present invention, in which glass fabric is reinforced parallel to the surface of the film.

Hereinafter, a detailed description will be given of the present invention.

The present invention addresses a method for manufacturing a colorless transparent polyimide film with reinforced glass fabric, which solves the problem of a plastic film substrate becoming optically opaque because of a difference in the refractive index between plastic film and glass fabric when the latter is reinforced in the former to enhance the thermal and mechanical properties of a substrate for flexible displays.

According to the present invention, the method for manufacturing a colorless transparent polyimide film with reinforced glass fabric comprises the following steps:

(1) preparation of a polyamic acid solution;

(2) positioning of the glass fabric on a substrate and casting the polyamic acid solution in a vacuum oven;

(3) evaporation of a solvent from the cast polyamic acid solution by controlling the temperature of the vacuum oven to form a polyamic acid film on the substrate; and (4) subjecting the polyamic acid film to imidization through thermal curing.

Typically, a polyimide film may be manufactured by polymerizing a dianhydride monomer and a diamine monomer to make a polyamic acid solution, evaporating the solvent from the polyamic acid solution to form a polyamic acid film, and subjecting the polyamic acid film to imidization through thermal curing.

Dianhydride and diamine monomers for the preparation of polyimide include various kinds of compounds, and the polyimide film properties, including color, transparency, glass transition temperature, thermal degradation temperature, and tensile strength, may considerably vary depending on the selective combination of these compounds.

However, a polyimide film obtained from a monomer combination of dianhydride and diamine has an inherent refractive index, which should match that of glass fabric for the polyimide film with reinforced glass fabric to become optically transparent.

Therefore, the present invention provides a variety of methods for manufacturing a polyimide film with reinforced glass fabric from a monomer combination of dianhydride and diamine, provided that the polyimide film and the glass fabric are matched in terms of refractive index.

In the present invention, the colorless transparent polyimide film having reinforced glass fabric may be manufactured in such a manner that a polyamic acid solution having a higher refractive index than that of the glass fabric and another polyamic acid solution having a lower refractive index than that of the glass fabric, upon forming the polyimide film, are mixed at an appropriate ratio to prepare a polyamic acid mixed solution, from which the solvent is then evaporated to form a polyamic acid film, which is then subjected to imidization through thermal curing, thereby obtaining a colorless transparent polyimide film wherein the polyimide film and the glass fabric are matched in refractive index.

For example, the blended polyamic acid solution is preferably prepared by blending polyamic acid solutions (A) and (B) which are higher and lower in refractive index than the glass fabric, respectively, upon forming the polyimide film.

The polyamic acid solutions (A, B) each are prepared under the condition that a dianhydride monomer compound and a diamine monomer compound are selected such that the dianhydride monomer compound of the polyamic acid solution (A) is identical to the dianhydride monomer compound of the polyamic acid solution (B), and the diamine monomer compound of the polyamic acid solution (A) is different from the diamine monomer compound of the polyamic acid solution (B), or that the diamine monomer compound of the polyamic acid solution (A) is identical to the diamine monomer compound of the polyamic acid solution (B), and the dianhydride monomer compound of the polyamic acid solution (A) is different from the dianhydride monomer compound of the polyamic acid solution (B), or that the dianhydride monomer compound of the polyamic acid solution (A) is different from the dianhydride monomer compound of the polyamic acid solution (B), and the diamine monomer compound of the polyamic acid solution (A) is different from the diamine monomer compound of the polyamic acid solution (B).

Moreover, the dianhydride monomer compound and the diamine monomer compound are preferably selected such that the polyimide film made using a polyamic acid solution (C) obtained by mixing the polyamic acid solutions (A, B) has a difference in refractive index of 0.01 or less from the glass fabric.

Also in the present invention, the colorless transparent polyimide film having reinforced glass fabric may be manufactured by copolymerizing dianhydride and diamine monomers to prepare a polyamic acid solution, evaporating the solvent to form a polyamic acid film, which is then subjected to imidization through thermal curing, so that the refractive indexes of the polyimide film and the glass fabric are matched within 0.01.

Preferably, the polyamic acid solution is prepared by combining one or two dianhydride monomer compounds and one or two diamine monomer compounds.

More preferably, the polyamic acid solution is prepared from a combination of a dianhydride compound and two different diamine compounds or a combination of two different dianhydride compounds and a diamine compound. Alternatively, the polyamic acid solution may be prepared from a combination of two different dianhydride compounds and two different diamine compounds. As such, when the polyimide films each are formed using one of the above dianhydride compound(s) and one of the above diamine compound(s), the dianhydride compound and the diamine compound should be selected such that of the above polyimide films, one is higher in refractive index than the glass fabric while the other is lower.

For example, when the polyamic acid solution is prepared by copolymerizing a combination of a dianhydride compound and two different diamine compounds (a, b), the dianhydride compound and the diamine compounds (a, b) should be selected such that of polyimide polymer films obtained from the dianhydride compound and the diamine compound (a) and from the dianhydride compound and the diamine compound (b), one is higher in refractive index than the glass fabric while the other is lower.

Likewise, when the polyamic acid solution is prepared from a combination of two different dianhydride compounds (c, d) and a diamine compound, the dianhydride compounds (c, d) and the diamine compound should be selected such that of polyimide polymer films obtained from the dianhydride compound (c) and the diamine compound and from the dianhydride compound (d) and the diamine compound, one is higher in refractive index than the glass fabric while the other is lower.

Also, in the combination of two different dianhydride compounds (c, d) and two different diamine compounds (a, b), of polyimide polymer films obtained from the dianhydride compound (c) and the diamine compound (a), from the dianhydride compound (c) and the diamine compound (b), from the dianhydride compound (d) and the diamine compound (a), and from the dianhydride compound (d) and the diamine compound (b), at least one should be higher in refractive index than the glass fabric while at least one should be lower.

In the course of preparation of the polyamic acid solution through copolymerization, the ratio of the sum of molar equivalents of the dianhydride monomer compounds to the sum of molar equivalents of the diamine monomer compounds is 1:1, and the refractive index of the polyimide film prepared from a dianhydride monomer compound(s) and a diamine monomer compound(s) is preferably controlled so as to be different by 0.01 or less from that of the glass fabric.

Because the dianhydride compound and the diamine compound chemically react at 1:1 in molar equivalent regardless of the kind thereof, the ratio of the sum of molar equivalents of all dianhydride compounds to the sum of molar equivalents of all diamine compounds, which participate in the reaction regardless of the kind and number of dianhydride and diamine compounds used, is adjusted to 1:1. If not so, the remaining monomers which do not participate in the reaction may be left behind in the film, undesirably deteriorating the quality of the film.

Because high transparency may be obtained when the difference in refractive index approximates to three decimal places, the refractive index is preferably adjusted in the above range.

Also, in the present invention, the dianhydride compound is preferably any one or more selected from the group consisting of 4,4'-oxydiphthalic anhydride (OPDA), pyromellitic dianhydride (PMDA), 3,3',4,4'-diphenylsulfone tetracarboxylic dianhydride (DSDA), 3,3',4,4'-benzophenone tetracarboxylic dianhydride (BTDA), 4-(2,5-dioxotetrahydrofuran-3-yl)-1,2,3,4-tetrahydronaphthalene-1,2-dicarboxylic anhydride (DTDA), 4,4'-bisphenol A dianhydride (BPADA), 4,4'-(hexafluoroisopropylidene)diphthalic anhydride (6FDA), bicycle[2.2.2]oct-7-ene-2,3,5,6-tetracarboxylic dianhydride (BCDA), 3,3',4,4'-biphenyl tetracarboxylic dianhydride (BPDA), 5-(2,5-dioxotetrahydrofuryl)-3-methyl-3-cyclohexene-1,2-dicarboxylic anhydride (DOMDA), ethylene diamine tetraacetic dianhydride (EDTE), and 1,2,4,5-cyclohexanetetracarboxylic dianhydride (CHDA).

The diamine compound is preferably any one or more selected from the group consisting of 2,2-bis(3-amino-4-hydroxyphenyl) hexafluoropropane (BAHFP), 1,3-bis(3-aminophenoxy)benzene (m-BAPB), 4,4'-bis(4-aminophenoxy) biphenyl (p-BAPB), 2,2-bis(3-aminophenyl) hexafluoropropane (BAPF), bis[4-(3-aminophenoxy)phenyl] sulfone (m-BAPS), 2,2-bis[4-(4-aminophenoxy)phenyl] sulfone (p-BAPS), bis(3-aminophenyl) sulfone (APS), m-xylylenediamine (m-XDA), p-xylylenediamine (p-XDA), 3,4'-oxydianiline (3,4-ODA), 2,2-bis(3-amino-4-methylphenyl)hexafluoropropane (BAMF), 4,4'-diaminooctafluorobiphenyl, 3,3'-dihydroxybenzidine, 2,2'-ethylenedianiline, 2,2'-bis(trifluoromethyl)benzidine (TFB), 2,2',5,5'-tetrachlorobenzidine, bis(3-aminophenyl)methanone, 2,7-diaminofluorene, 2-chloro-p-phenylenediamine, 1,3-bis(3-aminopropyl)-tetramethyldisiloxane, 1,1-bis(4-aminophenyl) cyclohexane, 9,9-bis(4-aminophenyl)fluorene, 5-(trifluoromethyl)-1,3-phenylenediamine, 4,4'-methylenebis(2-methylcyclohexylamine), 4-fluoro-1,2-phenylenediamine, 4,4'-(1,3-phenylenediisopropylidene)bisaniline, 4-nitro-1,3-phenylenediamine, 4-chloro-1,3-phenylenediamine, 1,3,5-triazine-2,4,6-triamine (Melamine), 3,5-diaminobenzonitrile, 1,3-bis(aminomethyl)cyclohexane (m-CHDA), 1,4-bis(aminomethyl)cyclohexane (p-CHDA), 2,2-bis[4-(4-aminophenoxy)phenyl]hexafluoropropane (6FBAPP), 2,2'-bis(trifluoromethyl)benzidine (MDB), 4,4'-oxydianiline (4,4'-ODA), 2,2-bis[4-(4-aminophenoxy)phenyl]propane (BAPP), 1,3-cyclohexanediamine, 1,4-cyclohexanediamine, and bis(4-aminophenyl) sulfide (4,4'-SDA).

Also in the present invention, the preparation method of the polyamic acid solution is not particularly limited, and any synthesis process may be used so long as it is typical. The polyamic acid copolymer solution may be prepared using any one process selected from among emulsion polymerization, dispersion polymerization, suspension polymerization, and precipitation polymerization.

Also in the present invention, the solvent for dissolving the dianhydride compound and the diamine compound is exemplified by dimethyl aceatmide (DMAc), but is not limited thereto.

Also in the present invention, the polyamic acid solution prepared using the above combination is applied on glass fabric positioned parallel to the substrate, and the solvent is evaporated from the polyamic acid solution applied on the glass fabric and substrate in the temperature range of 40-120° C., and thus the polyamic acid film is preferably formed.

The polyamic acid film is further subjected to imidization through thermal curing in the temperature range of 100-450° C., yielding a colorless transparent polyimide film having reinforced glass fabric.

Also in the present invention, the thickness of the glass fabric is preferably 1 μm to 500 μm, and the thickness of the colorless transparent polyimide film having reinforced glass fabric is preferably 20 μm to 1000 μm. The substrate on which the glass fabric is positioned is preferably any substrate which has a hard, flat and smooth surface and a melting point of 500° C. or higher, including flat glass and stainless steel.

According to the present invention, the polyimide substrate having reinforced glass fabric is configured such that the glass fabric is reinforced in the polyimide film so as to be parallel to the surface of the polyimide film, and such a polyimide substrate is colorless and transparent and has an optical transmittance of 85% or more at a wavelength of 500 nm.

A better understanding of the present invention may be obtained via the following examples which are set forth to illustrate, but are not to be construed to limit the present invention, which will be apparent to persons having ordinary knowledge in the art.

Example 1

2.31 g ($5.2 \times 10^{-3}$ mol) of 4,4'-(hexafluoroisopropylidene) diphthalic anhydride (6FDA) as a dianhydride monomer and 1.29 g ($5.2 \times 10^{-3}$ mol) of bis(3-aminophenyl)sulfone (APS) as a diamine monomer were added to 26.99 g of a dimethyl acetamide (DMAc) solvent, and these monomers were completely dissolved with slow stirring using a magnetic stirrer in a nitrogen atmosphere at 0° C. for 1 hr, and the resulting solution was polymerized with vigorous stirring at room temperature (25° C.) for 15 hr or more, thus preparing a polyamic acid solution (PAA-1). Separately, 5.47 g ($1.231 \times 10^{-2}$ mol) of 6FDA as a dianhydride monomer and 4.46 g ($1.231 \times 10^{-2}$ mol) of 2,2-bis(3-amino-4-methylphenyl)hexafluoropropane (BAMF) were added to 74.44 g of DMAc, and then treated in the same manner as above, thus preparing a polyamic acid solution (PAA-2). The polyamic acid solutions PAA-1 and PAA-2 were blended at a weight ratio of 4:6 (5.96 g:8.94 g), thus obtaining a blended polyamic acid solution.

To minimize generation of bubbles in a film forming process, the pressure inside the flask containing the blended polyamic acid solution was reduced by means of an aspirator, so that dissolved oxygen or micro-bubbles were thoroughly removed from the solution.

Glass fabric having an area of 95×95 $mm^2$ and a thickness of 25 μm was placed on a glass substrate having an area of 100×100 $mm^2$ and a thickness of 8 mm, after which the glass substrate was placed in a vacuum oven at room temperature (25° C.).

The blended polyamic acid solution was cautiously cast on the glass substrate and glass fabric positioned in the vacuum oven so as not to generate bubbles, after which the inner temperature of the vacuum oven was increased to 50° C. from room temperature at a rate of 5° C./min, maintained at 50° C. for 5 min, and increased to 110° C. from 50° C. at a rate of 2.5° C./min, and then maintained at 110° C. for 3 hr at a pressure of $10^{-2}$ Torr or lower, and the solvent was rapidly evaporated, thus forming a polyamic acid film.

Thereafter, the polyamic acid film having reinforced glass fabric was subjected to imidization through stepwise thermal curing, at a pressure of $10^{-2}$ Torr or lower, in such a way that it was heated to 170° C. from 110° C. at a heating rate of 0.4° C./min, heated to 250° C. from 170° C. at a heating rate of 1° C./min, and then maintained at 250° C. for 30 min, thereby manufacturing a colorless transparent polyimide film having reinforced glass fabric.

Example 2

5.33 g ($1.2 \times 10^{-2}$ mol) of 4,4'-(hexafluoroisopropylidene) diphthalic anhydride (6FDA) as a dianhydride monomer, and as diamine monomers, 1.3 g ($5.244 \times 10^{-3}$ mol) of bis(3-aminophenyl)sulfone (APS) and 2.45 g ($6.756 \times 10^{-3}$ mol) of 2,2-bis(3-amino-4-methylphenyl)hexafluoropropane (BAMF) were added to 68.07 g of DMAc, and these monomers were completely dissolved with slow stirring using a magnetic stirrer in a nitrogen atmosphere at 0° C. for 1 hr, and the resulting solution was copolymerized with vigorous stirring at room temperature (25° C.) for 15 hr or more, thus preparing a polyamic acid solution.

To minimize generation of bubbles in a film forming process, the pressure inside the flask containing the polyamic acid solution was reduced by means of an aspirator, so that dissolved oxygen or micro-bubbles were thoroughly removed from the solution.

Glass fabric having an area of 95×95 mm² and a thickness of 25 μm was placed on a glass substrate having an area of 100×100 mm² and a thickness of 8 mm, after which the glass substrate was placed in a vacuum oven at room temperature (25° C.).

The polyamic acid solution was cautiously cast on the glass substrate and glass fabric positioned in the vacuum oven so as not to generate bubbles and then the vacuum oven was evacuated to $10^{-2}$ Torr or lower, after which the rate of evaporation of the solvent from the cast polyamic acid solution was controlled through stepwise temperature change in such a way that the inner temperature of the vacuum oven was increased to 50° C. from room temperature at a rate of 5° C./min, maintained at 50° C. for 2 hr, increased to 80° C. from 50° C. at a rate of 1° C./min, and then maintained at 80° C. for 1 hr, thus forming a polyamic acid film.

Thereafter, the polyamic acid film having reinforced glass fabric was subjected to imidization through stepwise thermal curing, at a pressure of $10^{-2}$ Torr or lower, in such a way that it was heated to 110° C. from 80° C. at a heating rate of 1° C./min, maintained at 110° C. for 30 min, heated to 170° C. from 110° C. at a heating rate of 0.4° C./min, heated to 250° C. from 170° C. at a heating rate of 1° C./min and then maintained at 250° C. for 30 min, thereby manufacturing a colorless transparent polyimide film having reinforced glass fabric.

Example 3

6.22 g ($1.2 \times 10^{-2}$ mol) of 2,2-bis[4-(4-aminophenoxy)phenyl]hexafluoropropane (6FBAPP) as a diamine monomer, and as dianhydride monomers, 0.69 g ($2.796 \times 10^{-3}$ mol) of bicycle[2.2.2]oct-7-ene-2,3,5,6-tetracarboxylic dianhydride (BCDA) and 2.06 g ($9.204 \times 10^{-3}$ mol) of 1,2,4,5-cyclohexanetetracarboxylic dianhydride (CHDA) were added to 67.24 g of DMAc, and these monomers were completely dissolved with slow stirring using a magnetic stirrer in a nitrogen atmosphere at 0° C. for 1 hr, and the resulting solution was copolymerized with vigorous stirring at room temperature (25° C.) for 15 hr or more, thus preparing a polyamic acid solution.

To minimize generation of bubbles in a film forming process, the pressure inside the flask containing the polyamic acid solution was reduced by means of an aspirator, so that dissolved oxygen or micro-bubbles were thoroughly removed from the solution.

Glass fabric having an area of 95×95 mm² and a thickness of 25 μm was placed on a glass substrate having an area of 100×100 mm² and a thickness of 8 mm, after which the glass substrate was placed in a vacuum oven at room temperature (25° C.).

The polyamic acid solution was cautiously cast on the glass substrate and glass fabric positioned in the vacuum oven so as not to generate bubbles and then the vacuum oven was evacuated to $10^{-2}$ Torr or lower, after which the rate of evaporation of the solvent from the cast polyamic acid solution was controlled through stepwise temperature change in such a way that the inner temperature of the vacuum oven was increased to 50° C. from room temperature at a rate of 5° C./min, maintained at 50° C. for 2 hr, increased to 80° C. from 50° C. at a rate of 1° C./min, and then maintained at 80° C. for 1 hr, thus forming a polyamic acid film.

Thereafter, the polyamic acid film having reinforced glass fabric was subjected to imidization through stepwise thermal curing, at a pressure of $10^{-2}$ Torr or lower, in such a way that it was heated to 110° C. from 80° C. at a heating rate of 1° C./min, maintained at 110° C. for 30 min, heated to 170° C. from 110° C. at a heating rate of 0.4° C./min, heated to 250° C. from 170° C. at a heating rate of 1° C./min and then maintained at 250° C. for 30 min, thereby manufacturing a colorless transparent polyimide film having reinforced glass fabric.

Example 4

As dianhydride monomers, 2.59 g ($5.82 \times 10^{-3}$ mol) of 4,4'-(hexafluoroisopropylidene)diphthalic anhydride (6FDA) and 1.53 g ($6.18 \times 10^{-3}$ mol) of bicycle[2.2.2]oct-7-ene-2,3,5,6-tetracarboxylic dianhydride (BCDA), and as diamine monomers, 3.2 g ($6.18 \times 10^{-3}$ mol) of 2,2-bis[4-(4-aminophenoxy)phenyl]hexafluoropropane (6FBAPP) and 1.39 g ($5.82 \times 10^{-3}$ mol) of 4,4'-methylenebis(2-methylcyclohexylamine) were added to 65.29 g of DMAc, and these monomers were completely dissolved with slow stirring using a magnetic stirrer in a nitrogen atmosphere at 0° C. for 1 hr, and the resulting solution was copolymerized with vigorous stirring at room temperature (25° C.) for 15 hr or more, thus preparing a polyamic acid solution.

To minimize generation of bubbles in a film forming process, the pressure inside the flask containing the polyamic acid solution was reduced by means of an aspirator, so that dissolved oxygen or micro-bubbles were thoroughly removed from the solution.

Glass fabric having an area of 95×95 mm² and a thickness of 25 μm was placed on a glass substrate having an area of 100×100 mm² and a thickness of 8 mm, after which the glass substrate was placed in a vacuum oven at room temperature (25° C.).

The polyamic acid solution was cautiously cast on the glass substrate and glass fabric positioned in the vacuum oven so as not to generate bubbles and then the vacuum oven was evacuated to 10⁻² Torr or lower, after which the rate of evaporation of the solvent from the cast polyamic acid solution was controlled through stepwise temperature change in such a way that the inner temperature of the vacuum oven was increased to 50° C. from room temperature at a rate of 5° C./min, maintained at 50° C. for 2 hr, increased to 80° C. from 50° C. at a rate of 1° C./min, and then maintained at 80° C. for 1 hr, thus forming a polyamic acid film.

Thereafter, the polyamic acid film having reinforced glass fabric was subjected to imidization through stepwise thermal curing, at a pressure of $10^{-2}$ Torr or lower, in such a way that it was heated to 110° C. from 80° C. at a heating rate of 1° C./min, maintained at 110° C. for 30 min, heated to 170° C. from 110° C. at a heating rate of 0.4° C./min, heated to 250° C. from 170° C. at a heating rate of 1° C./min and then maintained at 250° C. for 30 min, thereby manufacturing a colorless transparent polyimide film having reinforced glass fabric.

CTE, tensile strength, and optical transmittance of the colorless transparent polyimide film having reinforced glass fabric of each of Examples 1 to 4 are shown in Table 1 below.

TABLE 1

Physical properties of colorless transparent polyimide film having reinforced glass fabric according to the present invention

|  | Ex.1 | Ex.2 | Ex.3 | Ex.4 |
|---|---|---|---|---|
| CTE (ppm/° C.) | 11 | 11 | 11 | 11 |
| Tensile Strength (MPa) | 248 | 250 | 247 | 240 |
| Optical Transmittance (%) @500 nm | 89 | 90 | 88 | 88 |

CTE was measured in the temperature range of 40° C. to 400° C. at a heating rate of 5° C./min under a load of 0.05 N using a thermo-mechanical analyzer (TMA-2940, TA Instruments, USA).

The CTE of a polyimide film having no reinforced glass fabric was 61 ppm/° C. at a temperature equal to or lower than the glass transition temperature (~260° C.), and increased drastically to 2837 ppm/° C. at a temperature higher than the glass transition temperature. However, the CTE of the colorless transparent polyimide film having reinforced glass fabric according to the present invention was 11-13 ppm/° C. in the temperature range from room temperature to 400° C. Hence, the glass fabric can be very effective at suppressing thermal expansion of the colorless transparent polyimide film.

Tensile strength was measured at room temperature at a tensile rate of 5 mm/min using a Universal Testing Machine (MICRO-IRHD-1, Hildebrand, USA).

The tensile strength of a polyimide film having no reinforced glass fabric was 52 MPa, whereas the colorless transparent polyimide film having reinforced glass fabric according to the present invention had a tensile strength of 240-250 MPa. When the glass fabric was reinforced in this way, tensile strength of the polyimide film was increased by about five times, compared to the case where the glass fabric was not reinforced.

Also, optical transmittance was measured at a rate of 400 nm/min in the wavelength range of 350 nm to 800 nm using an Ultraviolet-visible Spectrophotometer (V-670, Jasco, USA).

Depending on the wavelength range, the optical transmittance of the colorless transparent polyimide film having reinforced glass fabric according to the present invention was lower by about 3-8% than that of a polyimide film having no reinforced glass fabric. Nevertheless, the colorless transparent polyimide film having reinforced glass fabric according to the present invention exhibited a high optical transmittance of 88-90% at a wavelength of 550 nm.

As described hereinbefore, the present invention provides a method of manufacturing colorless transparent polyimide films having reinforced glass fabric. According to the present invention, the colorless transparent polyimide film having reinforced glass fabric is configured such that the colorless transparent polyimide film and the glass fabric are matched in refractive index, thereby satisfying an optical transmittance of 85% or more which is an optical requirement of a substrate for flexible displays, and exhibiting CTE as low as about 10 ppm/° C. and mechanical tensile strength increased by at least five times. Ultimately, the polyimide film according to the present invention can be very usefully applied to a substrate for flexible displays.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a colorless transparent polyimide film with glass fabric reinforced, comprising:
   (1) preparing a polyamic acid solution;
   (2) positioning glass fabric on a substrate, and casting the polyamic acid solution on the glass fabric in a vacuum oven;
   (3) evaporating a solvent from the cast polyamic acid solution by controlling temperature of the vacuum oven to form a polyamic acid film on the substrate; and
   (4) subjecting the polyamic acid film to imidization through thermal curing,
   wherein the polyamic acid solution is a polyamic acid solution (C) prepared by mixing polyamic acid solution (A) with higher refractive index and polyamic acid solution (B) with lower refractive index than that of the glass fabric, upon forming the polyimide film.

2. The method of claim 1, wherein the polyamic acid solutions (A, B) each are prepared under a condition that a dianhydride monomer compound and a diamine monomer compound are selected such that the dianhydride monomer compound of the polyamic acid solution (A) is identical to the dianhydride monomer compound of the polyamic acid solution (B), and the diamine monomer compound of the polyamic acid solution (A) is different from the diamine monomer compound of the polyamic acid solution (B).

3. The method of claim 1, wherein the polyamic acid solutions (A, B) each are prepared under a condition that a dianhydride monomer compound and a diamine monomer compound are selected such that the diamine monomer compound of the polyamic acid solution (A) is identical to the diamine monomer compound of the polyamic acid solution (B), and the dianhydride monomer compound of the polyamic acid solution (A) is different from the dianhydride monomer compound of the polyamic acid solution (B).

4. The method of claim 1, wherein the polyamic acid solutions (A, B) each are prepared under a condition that a dianhydride monomer compound and a diamine monomer compound are selected such that the dianhydride monomer compound of the polyamic acid solution (A) is different from the dianhydride monomer compound of the polyamic acid solution (B), and the diamine monomer compound of the polyamic acid solution (A) is different from the diamine monomer compound of the polyamic acid solution (B).

5. The method of claim 1, wherein the polyamic acid solution (C) is prepared such that the difference between the refractive index of the polyimide film formed using the polyamic acid solution (C) and the refractive index of the glass fabric is 0.01 or less.

6. A method of manufacturing a colorless transparent polyimide film with glass fabric reinforced, comprising:
   (1) preparing a polyamic acid solution by copolymerization of a dianhydride compound and two different diamine compounds (a, b) as monomers;
   (2) positioning glass fabric on a substrate, and casting the polyamic acid solution on the glass fabric in a vacuum oven;
   (3) evaporating a solvent from the cast polyamic acid solution by controlling temperature of the vacuum oven to form a polyamic acid film on the substrate; and
   (4) subjecting the polyamic acid film to imidization through thermal curing,
   wherein the polyamic acid solution is prepared under the condition that the dianhydride compound and the diamine compounds (a, b) are selected such that of polyimide films obtained from the dianhydride compound and the diamine compound (a) and from the dianhydride compound and the diamine compound (b), one has higher refractive index than that of the glass fabric while the other has lower refractive index than that of the glass fabric.

7. A method of manufacturing a colorless transparent polyimide film with glass fabric reinforced, comprising:
   (1) preparing a polyamic acid solution by copolymerization of two different dianhydride compounds (c, d) and a diamine compound as monomers;
   (2) positioning glass fabric on a substrate, and casting the polyamic acid solution in a vacuum oven;
   (3) evaporating a solvent from the cast polyamic acid solution by controlling temperature of the vacuum oven to form a polyamic acid film on the substrate; and
   (4) subjecting the polyamic acid film to imidization through thermal curing,
   wherein the polyamic acid solution is prepared under a condition that the dianhydride compounds (c, d) and the diamine compound are selected such that of polyimide polymer films obtained from the dianhydride compound (c) and the diamine compound and from the dianhydride compound (d) and the diamine compound, one has higher refractive index than that of the glass fabric while the other has lower refractive index than that of the glass fabric.

8. A method of manufacturing a colorless transparent polyimide film with glass fabric reinforced, comprising:
   (1) preparing a polyamic acid solution by copolymerization of two different dianhydride compounds (c, d) and two different diamine compounds (a, b) as monomers;
   (2) positioning glass fabric on a substrate, and casting the polyamic acid solution in a vacuum oven;
   (3) evaporating a solvent from the cast polyamic acid solution by controlling temperature of the vacuum oven to form a polyamic acid film on the substrate; and
   (4) subjecting the polyamic acid film to imidization through thermal curing,
   wherein the polyamic acid solution is prepared under a condition that the dianhydride compounds (c, d) and the diamine compounds (a, b) are selected such that among the polyimide polymer films obtained from the dianhydride compound (c) and the diamine compound (a), from the dianhydride compound (c) and the diamine compound (b), from the dianhydride compound (d) and the diamine compound (a) and from the dianhydride compound (d) and the diamine compound (b), at least one has higher refractive index than that of the glass fabric while at least another one has lower refractive index than that of the glass fabric.

9. The method of claim 6, wherein the ratio of the sum of molar equivalents of the dianhydride monomer compounds to the sum of molar equivalents of the diamine monomer compounds is 1:1.

10. The method of claim 6, wherein the difference between the refractive index of the polyimide films prepared from the dianhydride monomer compound(s) and the diamine monomer compound(s), and the refractive index of the glass fabric is 0.01 or less.

11. The method of claim 1, wherein the polyamic acid solution is cast by being applied on the glass fabric positioned parallel to the substrate, and the solvent is evaporated from the polyamic acid solution in the temperature range of 40° C. to 120° C., to form the polyamic acid film.

12. The method of claim 1, wherein the polyamic acid film is subjected to imidization through thermal curing in the temperature range of 100° C. to 450° C.

13. The method of claim 1, wherein the glass fabric has a thickness of 1 μm to 500 μm.

14. The method of claim 1, wherein the colorless transparent polyimide film with glass fabric reinforced has a thickness of 20 μm to 1000 μm.

15. The method of claim 1, wherein the substrate on which the glass fabric is positioned is flat glass or stainless steel.

16. The method of claim 7, wherein the ratio of the sum of molar equivalents of the dianhydride monomer compounds to the sum of molar equivalents of the diamine monomer compounds is 1:1.

17. The method of claim 8, wherein the ratio of the sum of molar equivalents of the dianhydride monomer compounds to the sum of molar equivalents of the diamine monomer compounds is 1:1.

18. The method of claim 7, wherein the difference between the refractive index of the polyimide films prepared from the dianhydride monomer compound(s) and the diamine monomer compound(s), and the refractive index of the glass fabric is 0.01 or less.

19. The method of claim 8, wherein the difference between the refractive index of the polyimide films prepared from the dianhydride monomer compound(s) and the diamine monomer compound(s), and the refractive index of the glass fabric is 0.01 or less.

20. The method of claim 6, wherein the polyamic acid solution is cast by being applied on the glass fabric positioned parallel to the substrate, and the solvent is evaporated from the polyamic acid solution in the temperature range of 40° C. to 120° C., to form the polyamic acid film.

21. The method of claim 7, wherein the polyamic acid solution is cast by being applied on the glass fabric positioned parallel to the substrate, and the solvent is evaporated from the polyamic acid solution in the temperature range of 40° C. to 120° C., to form the polyamic acid film.

22. The method of claim 8, wherein the polyamic acid solution is cast by being applied on the glass fabric positioned parallel to the substrate, and the solvent is evaporated from the polyamic acid solution in the temperature range of 40° C. to 120° C., to form the polyamic acid film.

23. The method of claim 6, wherein the polyamic acid film is subjected to imidization through thermal curing in the temperature range of 100° C. to 450° C.

24. The method of claim 7, wherein the polyamic acid film is subjected to imidization through thermal curing in the temperature range of 100° C. to 450° C.

25. The method of claim 8, wherein the polyamic acid film is subjected to imidization through thermal curing in the temperature range of 100° C. to 450° C.

26. The method of claim 6, wherein the glass fabric has a thickness of 1 μm to 500 μm.

27. The method of claim 7, wherein the glass fabric has a thickness of 1 μm to 500 μm.

28. The method of claim 8, wherein the glass fabric has a thickness of 1 μm to 500 μm.

29. The method of claim 6, wherein the colorless transparent polyimide film with glass fabric reinforced has a thickness of 20 μm to 1000 μm.

30. The method of claim 7, wherein the colorless transparent polyimide film with glass fabric reinforced has a thickness of 20 μm to 1000 μm.

31. The method of claim 8, wherein the colorless transparent polyimide film with glass fabric reinforced has a thickness of 20 μm to 1000 μm.

32. The method of claim 6, wherein the substrate on which the glass fabric is positioned is flat glass or stainless steel.

33. The method of claim 7, wherein the substrate on which the glass fabric is positioned is flat glass or stainless steel.

34. The method of claim 8, wherein the substrate on which the glass fabric is positioned is flat glass or stainless steel.

35. The method of claim 2, wherein the dianhydride compound is any one or more selected from the group consisting of 4,4'-oxydiphthalic anhydride (OPDA), pyromellitic dianhydride (PMDA), 3,3',4,4'-diphenylsulfone tetracarboxylic dianhydride (DSDA), 3,3',4,4'-benzophenone tetracarboxylic dianhydride (BTDA), 4-(2,5-dioxotetrahydrofuran-3-yl)-1,2,3,4-tetrahydronaphthalene-1,2-dicarboxylic anhydride (DTDA), 4,4'-bisphenol A dianhydride (BPADA), 4,4'-(hexafluoroisopropylidene)diphthalic anhydride (6FDA), bicycle[2.2.2]oct-7-ene-2,3,5,6-tetracarboxylic dianhydride (BCDA), 3,3',4,4'-biphenyl tetracarboxylic dianhydride (BPDA), 5-(2,5-dioxotetrahydrofuryl)-3-methyl-3-cyclohexene-1,2-dicarboxylic anhydride (DOMDA), ethylene diamine tetraacetic dianhydride (EDTE), and 1,2,4,5-cyclohexanetetracarboxylic dianhydride (CHDA).

36. The method of claim 3, wherein the dianhydride compound is any one or more selected from the group consisting of 4,4'-oxydiphthalic anhydride (OPDA), pyromellitic dianhydride (PMDA), 3,3',4,4'-diphenylsulfone tetracarboxylic dianhydride (DSDA), 3,3',4,4'-benzophenone tetracarboxylic dianhydride (BTDA), 4-(2,5-dioxotetrahydrofuran-3-yl)-1,2,3,4-tetrahydronaphthalene-1,2-dicarboxylic anhydride (DTDA), 4,4'-bisphenol A dianhydride (BPADA), 4,4'-(hexafluoroisopropylidene)diphthalic anhydride (6FDA), bicycle[2.2.2]oct-7-ene-2,3,5,6-tetracarboxylic dianhydride (BCDA), 3,3',4,4'-biphenyl tetracarboxylic dianhydride (BPDA), 5-(2,5-dioxotetrahydrofuryl)-3-methyl-3-cyclohexene-1,2-dicarboxylic anhydride (DOMDA), ethylene diamine tetraacetic dianhydride (EDTE), and 1,2,4,5-cyclohexanetetracarboxylic dianhydride (CHDA).

37. The method of claim 4, wherein the dianhydride compound is any one or more selected from the group consisting of 4,4'-oxydiphthalic anhydride (OPDA), pyromellitic dianhydride (PMDA), 3,3',4,4'-diphenylsulfone tetracarboxylic dianhydride (DSDA), 3,3',4,4'-benzophenone tetracarboxylic dianhydride (BTDA), 4-(2,5-dioxotetrahydrofuran-3-yl)-1,2,3,4-tetrahydronaphthalene-1,2-dicarboxylic anhydride (DTDA), 4,4'-bisphenol A dianhydride (BPADA), 4,4'-(hexafluoroisopropylidene)diphthalic anhydride (6FDA), bicycle[2.2.2]oct-7-ene-2,3,5,6-tetracarboxylic dianhydride (BCDA), 3,3',4,4'-biphenyl tetracarboxylic dianhydride (BPDA), 5-(2,5-dioxotetrahydrofuryl)-3-methyl-3-cyclohexene-1,2-dicarboxylic anhydride (DOMDA), ethylene diamine tetraacetic dianhydride (EDTE), and 1,2,4,5-cyclohexanetetracarboxylic dianhydride (CHDA).

38. The method of claim 6, wherein the dianhydride compound is any one or more selected from the group consisting of 4,4'-oxydiphthalic anhydride (OPDA), pyromellitic dianhydride (PMDA), 3,3',4,4'-diphenylsulfone tetracarboxylic dianhydride (DSDA), 3,3',4,4'-benzophenone tetracarboxylic dianhydride (BTDA), 4-(2,5-dioxotetrahydrofuran-3-yl)-1,2,3,4-tetrahydronaphthalene-1,2-dicarboxylic anhydride (DTDA), 4,4'-bisphenol A dianhydride (BPADA), 4,4'-(hexafluoroisopropylidene)diphthalic anhydride (6FDA), bicycle[2.2.2]oct-7-ene-2,3,5,6-tetracarboxylic dianhydride (BCDA), 3,3',4,4'-biphenyl tetracarboxylic dianhydride (BPDA), 5-(2,5-dioxotetrahydrofuryl)-3-methyl-3-cyclohexene-1,2-dicarboxylic anhydride (DOMDA), ethylene diamine tetraacetic dianhydride (EDTE), and 1,2,4,5-cyclohexanetetracarboxylic dianhydride (CHDA).

39. The method of claim 7, wherein the dianhydride compound is any one or more selected from the group consisting of 4,4'-oxydiphthalic anhydride (OPDA), pyromellitic dianhydride (PMDA), 3,3',4,4'-diphenylsulfone tetracarboxylic dianhydride (DSDA), 3,3',4,4'-benzophenone tetracarboxylic dianhydride (BTDA), 4-(2,5-dioxotetrahydrofuran-3-yl)-1,2,3,4-tetrahydronaphthalene-1,2-dicarboxylic anhydride (DTDA), 4,4'-bisphenol A dianhydride (BPADA), 4,4'-(hexafluoroisopropylidene)diphthalic anhydride (6FDA), bicycle[2.2.2]oct-7-ene-2,3,5,6-tetracarboxylic dianhydride (BCDA), 3,3',4,4'-biphenyl tetracarboxylic dianhydride (BPDA), 5-(2,5-dioxotetrahydrofuryl)-3-methyl-3-cyclohexene-1,2-dicarboxylic anhydride (DOMDA), ethylene diamine tetraacetic dianhydride (EDTE), and 1,2,4,5-cyclohexanetetracarboxylic dianhydride (CHDA).

40. The method of claim 8, wherein the dianhydride compound is any one or more selected from the group consisting of 4,4'-oxydiphthalic anhydride (OPDA), pyromellitic dianhydride (PMDA), 3,3',4,4'-diphenylsulfone tetracarboxylic dianhydride (DSDA), 3,3',4,4'-benzophenone tetracarboxylic dianhydride (BTDA), 4-(2,5-dioxotetrahydrofuran-3-yl)-1,2,3,4-tetrahydronaphthalene-1,2-dicarboxylic anhydride (DTDA), 4,4'-bisphenol A dianhydride (BPADA), 4,4'-(hexafluoroisopropylidene)diphthalic anhydride (6FDA), bicycle[2.2.2]oct-7-ene-2,3,5,6-tetracarboxylic dianhydride (BCDA), 3,3',4,4'-biphenyl tetracarboxylic dianhydride (BPDA), 5-(2,5-dioxotetrahydrofuryl)-3-methyl-3-cyclohexene-1,2-dicarboxylic anhydride (DOMDA), ethylene diamine tetraacetic dianhydride (EDTE), and 1,2,4,5-cyclohexanetetracarboxylic dianhydride (CHDA).

41. The method of claim 2, wherein the diamine compound is any one or more selected from the group consisting of 2,2-bis(3-amino-4-hydroxyphenyl)hexafluoropropane (BAHFP), 1,3-bis(3-aminophenoxy)benzene (m-BAPB), 4,4'-bis(4-aminophenoxy)biphenyl (p-BAPB), 2,2-bis(3-aminophenyl)hexafluoropropane (BAPF), bis[4-(3-aminophenoxy)phenyl]sulfone (m-BAPS), 2,2-bis[4-(4-aminophenoxy)phenyl]sulfone (p-BAPS), bis(3-aminophenyl)sulfone (APS), m-xylylenediamine (m-XDA), p-xylylenediamine (p-XDA), 3,4'-oxydianiline (3,4-ODA), 2,2-bis(3-amino-4-methylphenyl)hexafluoropropane (BAMF), 4,4'-diaminooctafluorobiphenyl, 3,3'-dihydroxybenzidine, 2,2'-ethylenedianiline, 2,2'-bis(trifluoromethyl)benzidine (TFB), 2,2',5,5'-tetrachlorobenzidine, bis(3-aminophenyl)methanone, 2,7-diaminofluorene, 2-chloro-p-phenylenediamine, 1,3-bis(3-aminopropyl)-tetramethyldisiloxane, 1,1-bis(4-aminophenyl)cyclohexane, 9,9-bis(4-aminophenyl)fluorene, 5-(trifluoromethyl)-1,3-phenylenediamine, 4,4'-methylenebis(2-methylcyclohexylamine), 4-fluoro-1,2-phenylenediamine, 4,4'-(1,3-phenylenediisopropylidene)bisaniline, 4-nitro-1,3-phenylenediamine, 4-chloro-1,3-phenylenediamine, 1,3,5-triazine-2,4,6-triamine (Melamine), 3,5-diaminobenzonitrile, 1,3-bis(aminomethyl)cyclohexane (m-CHDA), 1,4-bis(aminomethyl)cyclohexane (p-CHDA), 2,2-bis[4-(4-aminophenoxy)phenyl]hexafluoropropane (6FBAPP), 2,2'-bis(trifluoromethyl)benzidine (MDB), 4,4'-oxydianiline (4,4'-ODA), 2,2-bis[4-(4-aminophenoxy)phenyl] propane (BAPP), 1,3-cyclohexanediamine, 1,4-cyclohexanediamine, and bis(4-aminophenyl) sulfide (4,4'-SDA).

42. The method of claim 3, wherein the diamine compound is any one or more selected from the group consisting of 2,2-bis(3-amino-4-hydroxyphenyl)hexafluoropropane (BAHFP), 1,3-bis(3-aminophenoxy)benzene (m-BAPB), 4,4'-bis(4-aminophenoxy)biphenyl (p-BAPB), 2,2-bis(3-aminophenyl)hexafluoropropane (BAPF), bis[4-(3-aminophenoxy)phenyl]sulfone (m-BAPS), 2,2-bis[4-(4-aminophenoxy)phenyl]sulfone (p-BAPS), bis(3-aminophenyl) sulfone (APS), m-xylylenediamine (m-XDA), p-xylylenediamine (p-XDA), 3,4'-oxydianiline (3,4-ODA), 2,2-bis(3-amino-4-methylphenyl)hexafluoropropane (BAMF), 4,4'-diaminooctafluorobiphenyl, 3,3'-dihydroxybenzidine, 2,2'-ethylenedianiline, 2,2'-bis(trifluoromethyl)benzidine (TFB), 2,2',5,5'-tetrachlorobenzidine, bis(3-aminophenyl)methanone, 2,7-diaminofluorene, 2-chloro-p-phenylenediamine, 1,3-bis(3-aminopropyl)-tetramethyldisiloxane, 1,1-bis(4-aminophenyl)cyclohexane, 9,9-bis(4-aminophenyl)fluorene, 5-(trifluoromethyl)-1,3-phenylenediamine, 4,4'-methylenebis(2-methylcyclohexylamine), 4-fluoro-1,2-phenylenediamine, 4,4'-(1,3-phenylenediisopropylidene)bisaniline, 4-nitro-1,3-phenylenediamine, 4-chloro-1,3-phenylenediamine, 1,3,5-triazine-2,4,6-triamine (Melamine), 3,5-diaminobenzonitrile, 1,3-bis(aminomethyl)cyclohexane (m-CHDA), 1,4-bis(aminomethyl)cyclohexane (p-CHDA), 2,2-bis[4-(4-aminophenoxy)phenyl]hexafluoropropane (6FBAPP), 2,2'-bis(trifluoromethyl)benzidine (MDB), 4,4'-oxydianiline (4,4'-ODA), 2,2-bis[4-(4-aminophenoxy)phenyl] propane (BAPP), 1,3-cyclohexanediamine, 1,4-cyclohexanediamine, and bis(4-aminophenyl) sulfide (4,4'-SDA).

43. The method of claim 4, wherein the diamine compound is any one or more selected from the group consisting of 2,2-bis(3-amino-4-hydroxyphenyl)hexafluoropropane (BAHFP), 1,3-bis(3-aminophenoxy)benzene (m-BAPB), 4,4'-bis(4-aminophenoxy)biphenyl (p-BAPB), 2,2-bis(3-aminophenyl)hexafluoropropane (BAPF), bis[4-(3-aminophenoxy)phenyl]sulfone (m-BAPS), 2,2-bis[4-(4-aminophenoxy)phenyl]sulfone (p-BAPS), bis(3-aminophenyl) sulfone (APS), m-xylylenediamine (m-XDA), p-xylylenediamine (p-XDA), 3,4'-oxydianiline (3,4-ODA), 2,2-bis(3-amino-4-methylphenyl)hexafluoropropane (BAMF), 4,4'-diaminooctafluorobiphenyl, 3,3'-dihydroxybenzidine, 2,2'-ethylenedianiline, 2,2'-bis(trifluoromethyl)benzidine (TFB), 2,2',5,5'-tetrachlorobenzidine, bis(3-aminophenyl)methanone, 2,7-diaminofluorene, 2-chloro-p-phenylenediamine, 1,3-bis(3-aminopropyl)-tetramethyldisiloxane, 1,1-bis(4-aminophenyl)cyclohexane, 9,9-bis(4-aminophenyl)fluorene, 5-(trifluoromethyl)-1,3-phenylenediamine, 4,4'-methylenebis(2-methylcyclohexylamine), 4-fluoro-1,2-phenylenediamine, 4,4'-(1,3-phenylenediisopropylidene)bisaniline, 4-nitro-1,3-phenylenediamine, 4-chloro-1,3-phenylenediamine, 1,3,5-triazine-2,4,6-triamine (Melamine), 3,5-diaminobenzonitrile, 1,3-bis(aminomethyl)cyclohexane (m-CHDA), 1,4-bis(aminomethyl)cyclohexane (p-CHDA), 2,2-bis[4-(4-aminophenoxy)phenyl]hexafluoropropane (6FBAPP), 2,2'-bis(trifluoromethyl)benzidine (MDB), 4,4'-oxydianiline (4,4'-ODA), 2,2-bis[4-(4-aminophenoxy)phenyl] propane (BAPP), 1,3-cyclohexanediamine, 1,4-cyclohexanediamine, and bis(4-aminophenyl) sulfide (4,4'-SDA).

44. The method of claim 6, wherein the diamine compound is any one or more selected from the group consisting of 2,2-bis(3-amino-4-hydroxyphenyl)hexafluoropropane (BAHFP), 1,3-bis(3-aminophenoxy)benzene (m-BAPB), 4,4'-bis(4-aminophenoxy)biphenyl (p-BAPB), 2,2-bis(3-aminophenyl)hexafluoropropane (BAPF), bis[4-(3-aminophenoxy)phenyl]sulfone (m-BAPS), 2,2-bis[4-(4-aminophenoxy)phenyl]sulfone (p-BAPS), bis(3-aminophenyl) sulfone (APS), m-xylylenediamine (m-XDA), p-xylylenediamine (p-XDA), 3,4'-oxydianiline (3,4-ODA), 2,2-bis(3-amino-4-methylphenyl)hexafluoropropane (BAMF), 4,4'-diaminooctafluorobiphenyl, 3,3'-dihydroxybenzidine, 2,2'-ethylenedianiline, 2,2'-bis(trifluoromethyl)benzidine (TFB), 2,2',5,5'-tetrachlorobenzidine, bis(3-aminophenyl)methanone, 2,7-diaminofluorene, 2-chloro-p-phenylenediamine, 1,3-bis(3-aminopropyl)-tetramethyldisiloxane, 1,1-bis(4-aminophenyl)cyclohexane, 9,9-bis(4-aminophenyl)fluorene, 5-(trifluoromethyl)-1,3-phenylenediamine, 4,4'-methylenebis(2-methylcyclohexylamine), 4-fluoro-1,2-phenylenediamine, 4,4'-(1,3-phenylenediisopropylidene)bisaniline, 4-nitro-1,3-phenylenediamine, 4-chloro-1,3-phenylenediamine, 1,3,5-triazine-2,4,6-triamine (Melamine), 3,5-diaminobenzonitrile, 1,3-bis(aminomethyl)cyclohexane (m-CHDA), 1,4-bis(aminomethyl)cyclohexane (p-CHDA), 2,2-bis[4-(4-aminophenoxy)phenyl]hexafluoropropane (6FBAPP), 2,2'-bis(trifluoromethyl)benzidine (MDB), 4,4'-oxydianiline (4,4'-ODA), 2,2-bis[4-(4-aminophenoxy)phenyl] propane (BAPP), 1,3-cyclohexanediamine, 1,4-cyclohexanediamine, and bis(4-aminophenyl) sulfide (4,4'-SDA).

45. The method of claim 7, wherein the diamine compound is any one or more selected from the group consisting of 2,2-bis(3-amino-4-hydroxyphenyl)hexafluoropropane (BAHFP), 1,3-bis(3-aminophenoxy)benzene (m-BAPB), 4,4'-bis(4-aminophenoxy)biphenyl (p-BAPB), 2,2-bis(3-aminophenyl)hexafluoropropane (BAPF), bis[4-(3-aminophenoxy)phenyl]sulfone (m-BAPS), 2,2-bis[4-(4-aminophenoxy)phenyl]sulfone (p-BAPS), bis(3-aminophenyl) sulfone (APS), m-xylylenediamine (m-XDA), p-xylylenediamine (p-XDA), 3,4'-oxydianiline (3,4-ODA), 2,2-bis(3-amino-4-methylphenyl)hexafluoropropane (BAMF), 4,4'-diaminooctafluorobiphenyl, 3,3'-dihydroxybenzidine, 2,2'-ethylenedianiline, 2,2'-bis(trifluoromethyl)benzidine (TFB), 2,2',5,5'-tetrachlorobenzidine, bis(3-aminophenyl)methanone, 2,7-diaminofluorene, 2-chloro-p-phenylenediamine, 1,3-bis(3-aminopropyl)-tetramethyldisiloxane, 1,1-bis(4-aminophenyl)cyclohexane, 9,9-bis(4-aminophenyl)fluorene, 5-(trifluoromethyl)-1,3-phenylenediamine, 4,4'-methylenebis(2-methylcyclohexylamine), 4-fluoro-1,2-phenylenediamine, 4,4'-(1,3-phenylenediisopropylidene)bisaniline, 4-nitro-1,3-phenylenediamine, 4-chloro-1,3-phenylenediamine, 1,3,5-triazine-2,4,6-triamine (Melamine), 3,5-diaminobenzonitrile, 1,3-bis(aminomethyl)cyclohexane (m-CHDA), 1,4-bis(aminomethyl)cyclohexane (p-CHDA), 2,2-bis[4-(4-aminophenoxy)phenyl]hexafluoropropane (6FBAPP), 2,2'-bis(trifluoromethyl)benzidine (MDB), 4,4'-oxydianiline (4,4'-ODA), 2,2-bis[4-(4-aminophenoxy)phenyl] propane (BAPP), 1,3-cyclohexanediamine, 1,4-cyclohexanediamine, and bis(4-aminophenyl) sulfide (4,4'-SDA).

46. The method of claim 8, wherein the diamine compound is any one or more selected from the group consisting of 2,2-bis(3-amino-4-hydroxyphenyl)hexafluoropropane (BAHFP), 1,3-bis(3-aminophenoxy)benzene (m-BAPB), 4,4'-bis(4-aminophenoxy)biphenyl (p-BAPB), 2,2-bis(3-aminophenyl)hexafluoropropane (BAPF), bis[4-(3-aminophenoxy)phenyl]sulfone (m-BAPS), 2,2-bis[4-(4-aminophenoxy)phenyl]sulfone (p-BAPS), bis(3-aminophenyl) sulfone (APS), m-xylylenediamine (m-XDA), p-xylylenediamine (p-XDA), 3,4'-oxydianiline (3,4-ODA), 2,2-bis(3-amino-4-methylphenyl)hexafluoropropane (BAMF), 4,4'-diaminooctafluorobiphenyl, 3,3'-dihydroxybenzidine, 2,2'-ethylenedianiline, 2,2'-bis(trifluoromethyl)benzidine (TFB), 2,2',5,5'-tetrachlorobenzidine, bis(3-aminophenyl)methanone, 2,7-diaminofluorene, 2-chloro-p-phenylenediamine, 1,3-bis(3-aminopropyl)-tetramethyldisiloxane, 1,1-bis(4-aminophenyl)cyclohexane, 9,9-bis(4-aminophenyl)fluorene, 5-(trifluoromethyl)-1,3-phenylenediamine, 4,4'-methylenebis(2-methylcyclohexylamine), 4-fluoro-1,2-phenylenediamine, 4,4'-(1,3-phenylenediisopropylidene)bisaniline, 4-nitro-1,3-phenylenediamine, 4-chloro-1,3-phenylenediamine, 1,3,5-triazine-2,4,6-triamine (Melamine), 3,5-diaminobenzonitrile, 1,3-bis(aminomethyl)cyclohexane (m-CHDA), 1,4-bis(aminomethyl)cyclohexane (p-CHDA), 2,2-bis[4-(4-aminophenoxy)phenyl]hexafluoropropane (6FBAPP), 2,2'-bis(trifluoromethyl)benzidine (MDB), 4,4'-oxydianiline (4,4'-ODA), 2,2-bis[4-(4-aminophenoxy)phenyl] propane (BAPP), 1,3-cyclohexanediamine, 1,4-cyclohexanediamine, and bis(4-aminophenyl) sulfide (4,4'-SDA).

47. The method of claim 2, wherein the solvent for dissolving the dianhydride monomer compound and the diamine monomer compound is dimethyl acetamide (DMAc).

48. The method of claim 3, wherein the solvent for dissolving the dianhydride monomer compound and the diamine monomer compound is dimethyl acetamide (DMAc).

49. The method of claim 4, wherein the solvent for dissolving the dianhydride monomer compound and the diamine monomer compound is dimethyl acetamide (DMAc).

50. The method of claim 6, wherein the solvent for dissolving the dianhydride monomer compound and the diamine monomer compound is dimethyl acetamide (DMAc).

51. The method of claim 7, wherein the solvent for dissolving the dianhydride monomer compound and the diamine monomer compound is dimethyl acetamide (DMAc).

52. The method of claim 8, wherein the solvent for dissolving the dianhydride monomer compound and the diamine monomer compound is dimethyl acetamide (DMAc).

* * * * *